No. 25,229.
PATENTED AUG. 23, 1859.
I. WISEL.
WATER WHEEL.
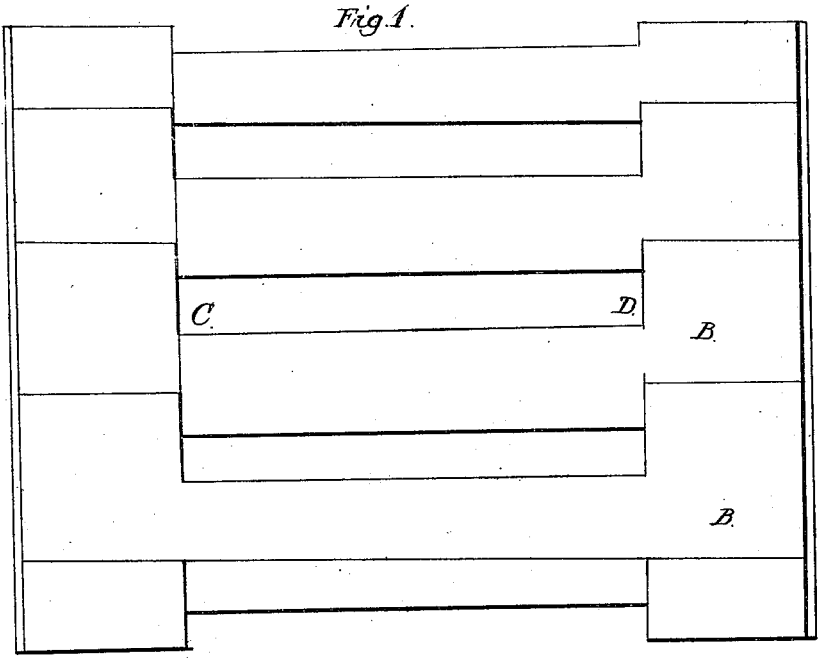
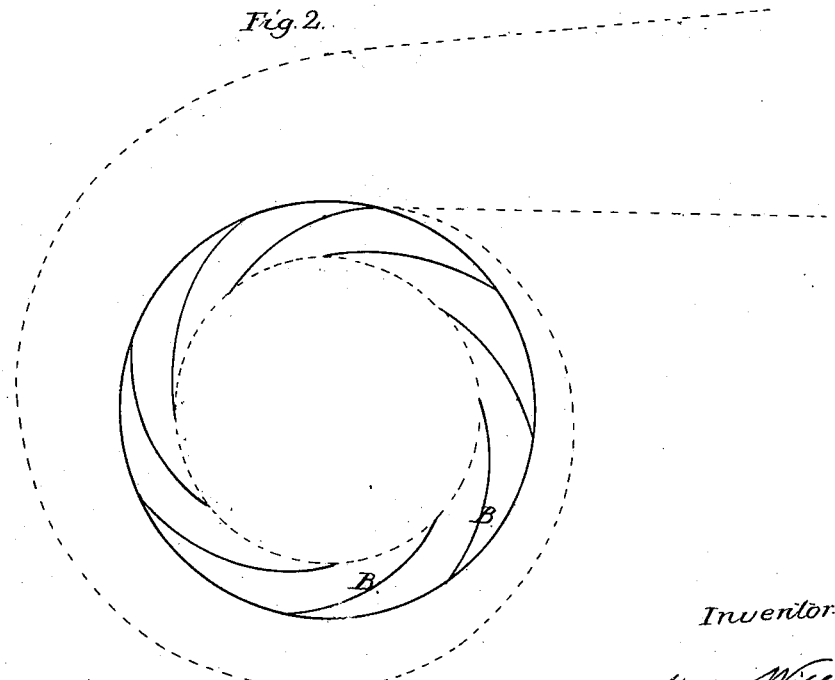
Witnesses:
Ethan F. Eddy
David Wisel
Inventor:
Ira Wisel

UNITED STATES PATENT OFFICE.

IRA WISEL, OF NEWBURY, MINNESOTA.

IMPROVEMENT IN WATER-WHEELS.

Specification forming part of Letters Patent No. 25,229, dated August 23, 1859.

*To all whom it may concern:*

Be it known that I, IRA WISEL, of Newbury, in the county of Fillmore, in the State of Minnesota, have invented a new and useful Water-Wheel; and I do hereby declare that the following is a full and exact description thereof, reference being had to the accompanying drawings, and to the letters of reference marked thereon.

The nature of my invention consists in making my wheel longer than the scroll or inlet or gate of water, with concave hooking buckets and heads to support said buckets, the buckets reaching out at each end of said scroll or gate a sufficient length to let the water escape therefrom in an outward direction, thereby securing the direct action together with the centrifugal force arising from the whirling motion of the water.

To enable others skilled in the art to make and use my invention, I will proceed to describe its construction and the action of the water upon it.

I make a shaft sufficiently large so as to leave just sufficient room for the action of the water between it and the circumference of the wheel. I then make the heads or ends as shown at H, Figure 1. I then insert the buckets B B, as shown in Figs. 1 and 2, between the heads H in the form represented by Fig. 2. I then proceed to make a scroll, water-chute, or gate in any of the known forms, so as to cause the water to strike the wheel in the direction it is intended to run, so as to hit each bucket at the same time, thus securing the action of the water on the whole circumference of the wheel at once. The water strikes the buckets from C to D, as represented in Fig. 1, and spreads to the ends of the wheel and discharges in an opposite direction from which it strikes it.

The dotted line S represents a convenient scroll or water-chute, the length of which shall be equal to C D, Fig. 1.

I do not claim any particular manner of applying the water. Neither do I claim the action of the water on the wheel; but I do claim—

The peculiar form of the buckets, in combination with the rest of the wheel.

IRA WISEL.

Witnesses:
DAVID WISEL,
ETHAN P. EDDY.